United States Patent [19]

Bains

[11] Patent Number: 4,536,789

[45] Date of Patent: Aug. 20, 1985

[54] APPARATUS FOR OBSERVATION IN A HIGH VELOCITY LIQUID STREAM

[76] Inventor: Paul C. Bains, 1075 Goldstream Ave., Victoria, British Columbia, Canada, V9B 2Y7

[21] Appl. No.: 521,364

[22] Filed: Aug. 8, 1983

[30] Foreign Application Priority Data

Mar. 3, 1983 [CH] Switzerland .............. 422791

[51] Int. Cl.³ .............................................. H04N 7/18
[52] U.S. Cl. ...................... 358/99; 350/319; 350/584; 354/64; 358/225
[58] Field of Search ............... 358/99, 100, 108, 229, 358/225; 354/63, 64; 350/584, 319

[56] References Cited

U.S. PATENT DOCUMENTS

| | | |
|---|---|---|
| 2,963,543 | 12/1960 | Link et al. |
| 2,982,191 | 5/1961 | Laval, Jr. |
| 3,075,113 | 1/1963 | Soar |
| 3,321,265 | 5/1967 | Clave et al. |
| 3,482,903 | 12/1969 | Thomas et al. |
| 3,565,516 | 2/1971 | Thomas ............................. 350/584 |
| 3,596,582 | 8/1971 | Sayer |
| 3,733,981 | 5/1973 | Buchanan |
| 3,788,730 | 1/1974 | Greenleaf |
| 3,838,434 | 9/1974 | Hughes ................................ 354/64 |
| 3,929,533 | 12/1975 | Horn .................................. 350/319 |
| 3,984,627 | 10/1976 | Galerne ............................... 358/100 |
| 4,172,428 | 10/1979 | Pariset ................................ 350/319 |
| 4,229,762 | 10/1980 | Healy |
| 4,295,721 | 10/1981 | Rebikoff |

FOREIGN PATENT DOCUMENTS

| | | |
|---|---|---|
| 231821 | 6/1923 | Canada |
| 416640 | 11/1943 | Canada |
| 531335 | 10/1956 | Canada |
| 645237 | 7/1962 | Canada |
| 831264 | 1/1970 | Canada |
| 893780 | 2/1972 | Canada |

OTHER PUBLICATIONS

*Cavitation,* Robert T. Knapp, James W. Daily and Fredrick G. Hammitt, McGraw Hill, New York, NY (1970), Chapter 5, pp. 152–211.

Primary Examiner—Howard W. Britton
Attorney, Agent, or Firm—Karen M. Gerken; Martin P. Hoffman; Mitchell B. Wasson

[57] ABSTRACT

The invention relates to an apparatus capable of observing an object in the path of a liquid stream while a radiation receiving part of the apparatus is positioned in the liquid stream. In a preferred form the invention relates to an apparatus capable of monitoring an excavation, which uses a high velocity liquid stream as the means of excavation, while the excavation is in progess, the invention comprising radiation receiving means for observing an object when the radiation receiving means is in a clear liquid stream flowing towards the object, the radiation receiving means comprising an observation window and cavitation prevention means disposed adjacent the observation window downstream thereof, the cavitation prevention means substantially assuming the shape of a zone of cavitational probability of a downstream end of the radiation receiving means when in a liquid stream of a selected velocity at which cavitation is possible, said cavitation prevention means thereby preventing cavitation when the liquid stream passes said downstream end of the radiation receiving means at or below the selected velocity.

28 Claims, 10 Drawing Figures

APPARATUS FOR OBSERVATION IN A HIGH VELOCITY LIQUID STREAM

FIELD OF THE INVENTION

The invention relates to an apparatus capable of observing an object in the path of a liquid stream whilst a radiation receiving part of the apparatus is positioned in the liquid stream. In a preferred form the invention relates to an apparatus capable of monitoring an excavation, which uses a high velocity liquid stream as the means of excavation, whilst the excavation is in progress.

BACKGROUND OF THE INVENTION

If one wishes to observe an object embedded in or lying on a lake bed, a difficulty is that the water around the object may be so cloudy, or become so cloudy after attempting to uncover the object, that normal underwater photographic equipment becomes ineffective. The cloudy water prevents or impairs any visual observation.

Such difficulty may be overcome by providing a path of clear liquid between the object and the means of observation. Conveniently, the path of clear liquid used is a liquid stream at sufficient velocity to be simultaneously the means of excavation, i.e. the means by which the object is uncovered.

In order to provide an observing apparatus which will successfully operate in such a clear liquid stream which is at sufficient velocity for excavation, a problem of design arises. Thus when any body is immersed in a liquid stream, as the liquid passes over the downstream end of the body, the liquid tends not to adhere or conform entirely to the shape of the body. This creates a negative pressure in, or approaches a vacuum at the region downstream of the body which causes vapourization of the liquid in this downstream region, forming bubbles. This bubble formation is referred to as cavitation and a zone of cavitational probability can be defined as the space in which cavitation is likely to occur. The bubbles collapse and disappear a short distance after clearing the zone of cavitational probability, where the negative pressure is no longer present. These bubbles are, of course, between the observing apparatus, such as a camera, and the object and therefore obscure the desired image.

Cavitation becomes a problem for example when a shipwreck, buried in silt or sand, is to be excavated by means of a high velocity water jet (i.e. of sufficient velocity to dislodge loose particulate matter) and it is desired to monitor the excavation whilst the excavation is in progress. At higher liquid velocities, such as are required for excavation purposes, prevention of cavitation is a significant factor. Thus if a video camera for example is positioned within the water jet in order to observe any object falling in the path of the jet, cavitation at the downstream end of the camera will impair observation.

It has now been discovered that in order to prevent or reduce cavitation downstream of an observing apparatus within a liquid stream of sufficient velocity for excavation, it is necessary to modify the shape of the downstream end of the apparatus, so that it substantially assumes the shape of the zone of cavitational probability which would otherwise be formed. Although this modified shape may be a parabolic shape, it is to be understood that the determining factors which define the shape arise from a consideration of the pressure vector components of the liquid stream as it travels past the immersed apparatus. Thus if, for example, observation is effected by means of a video camera and accessories, arranged in a streamlined cylindrical cylinder, with the viewing lens at the downstream end, then by attaching to the downstream end of the container a transparent cover which is substantially the same shape as the zone of cavitational probability of the downstream end, the zone is separated from the liquid stream and cavitation can thus be reduced or eliminated, making it possible to obtain an unimpaired image of an object downstream of the video camera.

STATEMENT OF THE INVENTION

Thus according to the present invention there is provided an apparatus comprising radiation receiving means for observing an object when the radiation receiving means is in a clear liquid stream flowing towards the object, the radiation receiving means comprising an observation window and cavitation prevention means disposed adjacent the observation window downstream thereof, the cavitation prevention means substantially assuming the shape of a zone of cavitational probability of a downstream end of the radiation receiving means when in a liquid stream of a selected velocity at which cavitation is possible, said cavitation prevention means thereby preventing cavitation when the liquid stream passes said downstream end of the radiation receiving means at or below the selected velocity.

The apparatus may further comprise a first conduit to guide the liquid stream towards the object, wherein the radiation receiving means is located within the first conduit such that the cavitation prevention means is adjacent the downstream end of the first conduit and the first conduit is shaped to follow the shape of the cavitation prevention means such that the liquid flowing past the cavitation prevention means has a cross-sectional area which is substantially uniform. This shaping of the downstream end of the first conduit further assists prevention of cavitation. The shape of the downstream end of the first conduit may also be varied according to other considerations. A convergent downstream end will increase the back-pressure within the apparatus and velocity of the discharging liquid and a divergent downstream end will reduce the back-pressure within the apparatus and velocity of the discharging liquid.

According to another embodiment the first conduit is disposed within a second conduit. The first conduit is preferably adapted so that a portion of the liquid stream passing through the first conduit is caused to flow in a reverse direction in the second conduit whereby debris or particulate matter suspended in a liquid environment adjacent the downstream end of the first conduit is drawn into the second conduit and transported away from the radiation receiving means.

The term "radiation receiving means" is intended to include a camera, video equipment or other means to receive an image, whether by way of visible light or other electromagnetic radiation. It will be appreciated that display means may be disposed adjacent to or remote from the radiation receiving means. Although visible light is referred to in the following discussion it will be readily apparent to a person skilled in the art that the same principles which govern the use of visible light as the radiation are applicable to other types of electromagnetic radiation with suitable apparatus modification.

The cavitation prevention means (hereafter alternatively referred to as the cover) is the modified shape of the downstream end of the radiation receiving means to prevent cavitation. In the above example of a video camera, the cavitation means is the transparent cover which is substantially the same shape, generally parabolic, as the zone of cavitational probability. The shape of the zone of cavitational probability depends in part on the velocity of the liquid stream, but the shape which will be effective for a given velocity will also be effective for lower velocities. Therefore the velocity selected to arrive at a suitable shape for the cavitation prevention means would appropriately be the highest velocity at which it is intended to operate the apparatus. The cavitation prevention means may extend to a point at its downstream end to enhance prevention of cavitation in a liquid stream of very high velocity.

It will be appreciated that the shape and size of the zone of cavitational probability formed in the absence of any cavitation prevention means will be largely dependent upon the velocity of the liquid stream, the shape of the downstream end of the radiation receiving means and, if present, the internal configuration of the first conduit adjacent the downstream end and its interrelationship with the shape of the downstream end of the radiation receiving means. Therefore the desired shape of the cavitation prevention means can be ascertained by observing the shape of the zone of cavitational probability which is formed in the absence of a cavitation prevention means.

In theoretically determining the precise design of the cavitation prevention means, some understanding of liquid stream behaviour and cavitation phenomena is required. A reference which deals in detail with cavitation is "Cavitation" by R. T. Knapp, J. W. Daily and F. G. Hammit.

As a liquid stream in Laminar flow, flows internally through a cylindrical conduit, the flow distributes itself as concentric cylindrical layers flowing past each other in a manner determined by the shear stress and shear strain or viscosity of the liquid, known as boundary layer action. Velocity is slowest near the conduit walls and most rapid in the center of flow. A fully developed velocity distribution brought about by boundary layer action is called Poiseuille flow. In Newtonian liquids such as water, this distribution assumes a parabolic shape. A similar relationship exists for flow around an immersed body, such as the apparatus of the present invention.

An outline of boundary layer stream separation about the negative pressure zone at the downstream end of an immersed body is defined as a wake. The shape of this wake is dependant on a relationship between viscous force and liquid stream inertia. A measure of the ratio of inertia to viscous force is the Reynolds number $R_e$ and deformation of wake separation increases with increased values of $R_e$.

Reynolds number $R_e = (\rho V L)/u$ $\rho$ = liquid density
V = liquid velocity
L = length at interaction
u = absolute viscosity of liquid A classic example of wake or Separation flow may be illustrated by considering a sphere immersed in a liquid stream of Laminar flow at various values of Reynolds number.

In a very slow flow, at a Reynolds number of $R_e \leq 1$, inertia force is negligable in comparison to viscous force, and no separation occurs as the boundary layer immediately closes over the trailing surface of the sphere. As the Reynolds number is increased towards $R_e \approx 10$, wake separation occurs and eddies form at the trailing end of the sphere. This negative pressure zone will form liquid-filled bubbles.

Wake separation of a flat ended body in a liquid stream will behave similarly to that of a sphere. A blunt cylinder will cause wake separation proportional to that of a sphere, except that the wake will not deform wider than the diameter of the cylinder.

At Reynolds numbers in the order of $R_e \approx 100$, the bubble Vortices separate alternately in oscillation and shed what are known as Karman Vortex Street forms. As the Reynolds number is increased further, oscillation disturbance becomes more apparent and successive portions of vortex are discharged downstream at regular intervals and wake reconnection downstream, is no longer apparent. When the Reynolds number is in the order of $R_e \approx 195$, the vortices downstream of the sphere, break down further. By $R_e \approx 2500$ the vortices diffuse as rapidly as they are created. The wake progressively widens through $R_e \approx 5000$ to $R_e \approx 15,000$. At Reynolds numbers in the order of $R_e \approx 10,000$ and above, the wake is fully turbulent.

In the above discussion of wake separation phenomena, it should be understood that cavitation may not have taken place, for example when the separation flow cavities are liquid filled. Wake separation may progress completely through these stages and yet viewing through the liquid stream still appear clear. This does not mean that cavitation does not occur within these ranges of Reynolds numbers. Cavitation may occur in separation flow, but all separation or wakes are not cavitation flow.

In cavitation flow a similar set of circumstances overlap with, or occur after the wake or separation flow phenomena. Instead of Reynolds number, cavitation is expressed as the Cavitation number K, based on variables more consistent with the narrow range of cavitation, rather than the wide ranged Logarithmic Reynolds number.

$$\text{Cavitation number } K = \frac{P_o - P_v}{\rho \cdot \frac{V_o^2}{2}}$$

$P_o$ = absolute static pressure
$P_v$ = vapor pressure of liquid
$\rho$ = density of liquid
$V_o$ = reference velocity While Cavitation number K is not a complete measure of full dynamic similarity, as some variables of flow are omitted, the Cavitation number K has been adopted for convenience for comparison of cavitation events. While K may have a certain value in a sequence of events for a particular set of conditions, the same immersed body under slightly different conditions, may produce a higher or lower K value. Therefore it is not possible to generally quote a set of reference velocities for corresponding values of K for a particular immersed body shape without detailing every variable, and any values of K quoted, should be considered for comparison only.

A classic example of cavitation may be illustrated by considering a sphere immersed in a liquid creating wake separation flow at various likely values of cavitation number K.

Cavitation begins with inception or microscopic bubbling in the most negative pressure zone of the wake, which is in the shear zone of the wake boundary and a hypothetical value of K might be 1.25. At K=0.55 cavitation grows in intensity and gradually displaces liquid in the wake and spreads over the shear layer or wake outline. Cavitation may appear as many individual travelling cavities. When K=0.50 cavitation may next mass in groups of travelling cavities and extend over the entire wake outline and into the wake interior. At K=0.45 cavitation substantially assumes the interior of the wake and extends into the boundary layer outlining wake separation. By K=0.05 the cavitation will have grown with intensity until the interior of the wake is liquid-free, this is known as Super Cavitation.

The outstanding variables effecting cavitation number K are liquid stream velocity and pressure. At constant absolute pressure, stream velocity in relation to the immersed body shape are directly responsible for pressure changes within the separation wake. Therefore cavitation may be considered in direct relation with immersed body shape. After separation, both types of flow are once more subject to velocity distribution brought about by boundary layer action. Therefore by observing wake profiles of separation wake flow for consideration of streamlining features, we have reasonable insight in choosing streamlined shapes suitable for reduction of cavitation in cavitation flow.

An analogy may be made between the negative pressure zone within wakes of separation flow and the pressure drop that causes cavitation, in that at the downstream end of a body, the shape of a streamlined afterbody, i.e. a cavitation prevention means, which would substantially reduce the pressure drop causing cavitation flow, would substantially assume the negative pressure zone within a suitably long re-connecting wake outline in wake or separation flow.

If corresponding values are substituted into the Reynolds number and Cavitation number formulae for approximate comparison, it will be seen that a stream velocity occurs within the turbulent region of Reynolds numbers where wake reconnection is not apparent, and that the wake is cavitational.

In such a case, the longest feasible wake profile may be chosen as the streamlined shape for a cavitation prevention means for the downstream end of an apparatus according to the invention. This streamlining greatly reduces pressure drop within the wake. A further improvement to the device can be made, particularly where high stream velocity is required, by making use of positive pressure created by the internal contour of a guiding conduit or first conduit to further reduce cavitation.

Separation flow wakes are generally parabolic at reconnection. Therefore, generally, a profile which would include the entire volume acted on by negative pressure would be a parabola, drawn to a hyperbolic point. Since it is only necessary to reduce a major portion of the negative pressure zone to maintain the pressure within the wake above the vapor pressure and successfully reduce cavitation, a variety of hybrid shapes may be used with success. For example, a parabola drawn to a conical point, since it is almost the same volume as a parabola drawn to a hyperbolic point, would usually be sufficient to reduce cavitation.

An exception to the parabolic shape may be considered for Non-Newtonian liquids, e.g. water with special lubricant additives, food liquids and paint. While the relationship between shear stress and shear strain in Newtonian liquids, such as water, is a linear function resulting in a Poiseuille flow velocity distribution which is parabolic, the relationship between shear stress and shear strain in Non-Newtonian liquids is a nonlinear function, and the shape of the Poiseuille flow velocity distribution varies to conical.

The volume of the tip of the wake interior zone, with respect to its total volume, in most applications may be considered to be negligable. This is particularly true when streamlining maintains pressure within the wake sufficiently above the critical vapor pressure (0.17 p.s.i.a. @50° F. for water) at the maximum operational velocity required of the liquid stream, and particularly where the additional improvement of the guiding conduit is employed, i.e. where the first conduit is shaped to follow the shape of the cavitation prevention means. Thus, the tip of the cavitation prevention means may conveniently be a blunt parabola or cone where inertia due to the velocity of the liquid stream is insufficient to cause cavitation in the reduced point and creates a clear liquid-filled bubble instead.

The observation window is the space through which electromagnetic radiation from the object under observation is received by the radiation receiving means. In the case of a camera, video or other optical apparatus, the observation window would normally be occupied by a lens at the downstream end of the radiation receiving means.

The apparatus may be adapted for use in any liquid environment but for convenience of description reference will be made to water environments such as lakes, oceans and rivers for which the liquid stream used would preferably be a water stream.

Using as an example the mud bottom of the ocean, the clear water for the liquid stream may be obtained from the surface water where the surface water is clear. A video camera is mounted in the centre of a flowing stream or column of water enclosed by a first conduit or nozzle. The water column provides a clear path through which the camera can see, water being pumped past the camera from the nearby clear source. The water column at appropriate velocity can also be used to dig or displace mud. This system can further be used in conjunction with a syphon dredge where the water jet or column erodes the mud and then other high pressure water jets direct the slurry of mud and water away from this area, transferred by a second conduit or dredging pipe.

The radiation receiving means should preferably be made as small in diameter as possible. A video assembly may be used as radiation receiving means, by arranging the components in a tube so that the lens assembly, Vidicon tube, and camera circuitry are all in line. By making the camera long and narrow the volume of water required to form an extending column may be reduced.

The width of field or area the radiation receiving means can observe depends on the diameter of the water column and thus the volume of water supplied to the first conduit. The distance the radiation receiving means may observe depends on volume and pressure as well.

Illumination means is a source of the required electromagnetic radiation e.g. lighting. In the case of a video camera the light required for its operation will depend on the light level at which the camera's Vidicon is designed to operate, and a lower minimum light level unit such as a Newvicon arrangement may be substituted. The illumination means may be arranged in a circular fashion at the downstream end of the first conduit.

It will be apparent that the cavitation prevention means should permit the passage of the radiation used. In the case of visible light, as cavitation prevention means a clear glass or plastic cover, parabolically shaped, hollow, and of uniform wall thickness (or even slightly thicker towards the downstream end) may be placed over the downstream end of the radiation receiving means, e.g. the lens of a camera. This shape reduces cavitation at the downstream end of the camera.

To compensate for refraction distortion caused by the volume between the downstream end of the cavitation prevention means and the observation window, the same volume may be filled with a compensating liquid. The compensating liquid would normally have a refractive index close to that of the liquid stream. Under these conditions, the assembly downstream of the observation window will seem to disappear when in use, and the object as observed by the apparatus will be substantially undistorted. A flat lens, may be incorporated into the cover at the upstream end of the cover, to retain compensating liquid therein.

Compensating liquids with indices of refraction higher or lower than the liquid stream may be used for magnification, diminishing or wide angle effects.

When the liquid stream is a water stream the compensating liquid may be distilled water with suitable antibacterial agents. There may also be a liquid filling plug and a thermal expansion compensation piston incorporated in the cover e.g. in the upstream end of the cover.

In the event that a liquid filled cavitation prevention means may not be used, due to some extreme or special environmental condition, at somewhat less light-gathering capability, a frusto-conical optical window with suitable complementary optical elements to substantially increase the field of viewing, may be substituted for the liquid filled cover arrangement. This lense assembly may be incorporated within the cover such that the exterior of the cover retains a shape substantially assuming the shape of the zone of cavitational probability of the downstream end of the radiation receiving means. Minimal frontal area of the smallest diameter of the frusto-conical window interfaces the liquid stream. A suitable frusto-conical window and lense arrangement that may be adapted to this purpose is described in U.S. Pat. No. 3,321,265, (Issued May 23, 1967 to Clave et al.).

The apparatus, with suitable modifications where necessary, is available for a wide variety of uses. By using a liquid stream at a suitable pressure, the apparatus may be used to dig trenches or holes whilst simultaneously observing the excavation, so that objects may be uncovered, retrieved or surveyed for future salvage. It may be used for continuous viewing or intermittently for taking individual photographs. With suitable modification, e.g. a valve or steering jets, it can be remote controlled for searching an ocean or river bottom without the aid of divers. Streamlining the apparatus would reduce the risk of entanglement and facilitate withdrawal from mud or other obstacles. It can be adapted to remove disturbed debris for collecting or processing at a remote area.

BRIEF DESCRIPTION OF THE DRAWINGS

The invention will be further described with reference to the accompanying drawings showing, by way of example, preferred embodiments of the invention, in which.

DESCRIPTION OF PREFERRED EMBODIMENTS

In the following description, the drawings will be discussed with reference to visible light as the electromagnetic radiation, but it will be readily appreciated that, with appropriate modification, the arrangements shown and discussed may be used for other types of electromagnetic radiation.

Figure 1:
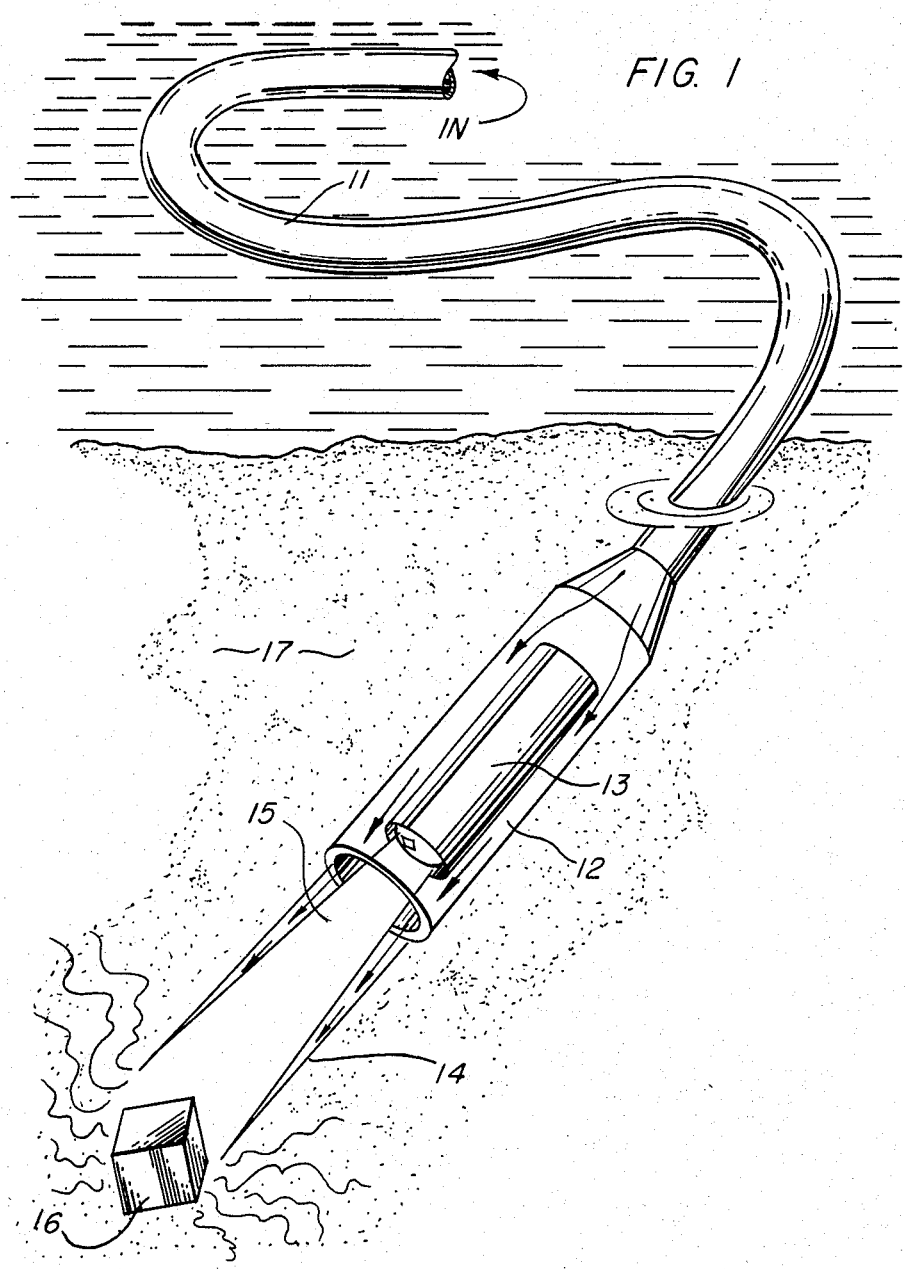
FIG. 1 is a diagram to illustrate generally how the apparatus operates.

As shown in FIG. 1, a clear liquid, for example, water is pumped via a delivery hose 11 to the downstream end of a first conduit or nozzle 12 past the radiation receiving means shown as camera 13 to form a water column 14 of clear water in the line of sight 15 of the camera providing a path of clear liquid to an object 16 under observation embedded in mud generally indicated by numeral 17. The image obtained by the camera is transmitted and displayed on a screen which may be conveniently disposed above the water on a control console, or adjacent the radiation receiving means where a diver may observe.

Figure 2:
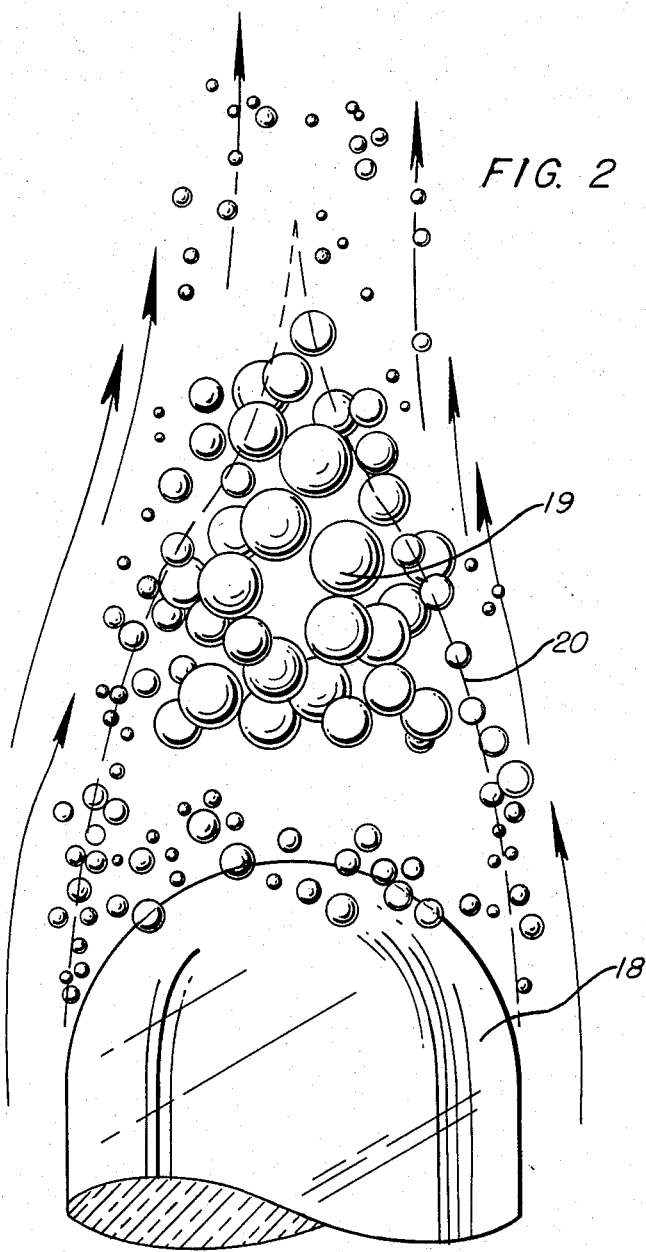
FIG. 2 is a diagram of cavitation occurring at the downstream end of an object without the cavitation prevention means of the invention.

FIG. 2 shows how cavitation occurs when a liquid stream (flowing in the direction of the arrows) flows past a hemispherical object 18. The resulting cavitation is shown by the formation of bubbles 19 in the zone of cavitational probability generally indicated by numeral 20.

Figure 3:
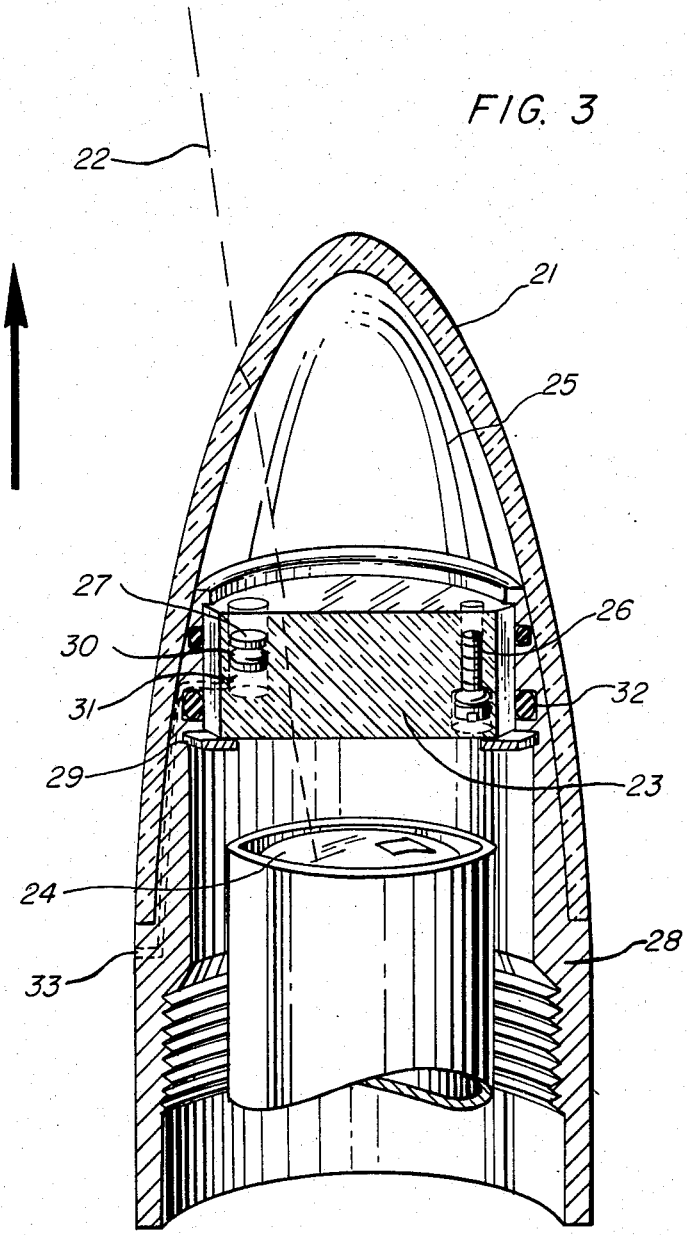
FIG. 3 is a partial cross-sectional view of the downstream end of an embodiment of the invention and shows the shape of a typical cavitation prevention means.

In FIG. 3 the correction of the distortion caused by the cavitation prevention means, which in this figure is shown as a parabolic cover 21, is shown by the refracted light ray 22. The shape of cover 21 shown works well for a medium to high velocity liquid stream. A flat lens 23 is placed inside the cover 21, adjacent and downstream of the observation window occupied by a camera lens 24. (In the figure, the downstream direction is indicated by the bold arrow adjacent the drawing.) The space 25 between the downstream end or tip of the cover and flat lens 23, is filled with a refractive equalizer compensating liquid, for example to correct distortion, the compensating liquid may be a clear liquid of refractive index close to that of the liquid stream so that the assembly downstream of camera lens 24 does not effectively distort viewing. A liquid filling plug 26, and a thermal expansion compensation piston 27 may be incorporated in flat lens 23. If the apparatus is to be used at extreme depths, a pressure compensation system may be incorporated by equalizing the pressure on the liquid in the space 25 with the pressure within the liquid stream, by a small vent hole 33 open to liquid stream pressure, originating at the blind end of the compensation piston bore 31, thus as the compensation liquid in space 25 expands or contracts, piston 27 may travel up or down within bore 31, while the pressure within cover 21 is equalized with the external pressure of the liquid stream. Pressure equalization may also be accomplished by use of an accumulator bag, within or remote from the cover. The flat lens 23 may be retained in a camera housing 28 (which may be of stainless steel), by snap-ring 29 or when pressures are severe, a threaded collar (not shown). The flat lens 23 may be sealed within the cover 28 by flexible O-ring(s) 32. The thermal expansion piston 27 is provided with a flexible O-ring 30 seated in bore 31 in lens 23. If the lens 23 is made of acrylic material, the bore may be machined directly into the lens.

The parabolic cover 21 may be made of glass, acrylic or other suitable transparent material, and may be fastened to the metal housing 28 with a suitable epoxy resin adhesive, after the mating surfaces have been roughened by glass bead blasting. Where it is desired to further minimize cavitation, the cavitation prevention means or parabolic shaped cover may be drawn into a point, for example a hyperbolic or conical point, or a metal tip may be fastened to the tip of the cover. This latter method will leave a small blurred area or obscuring dot in the centre of the observed image.

Figure 4:
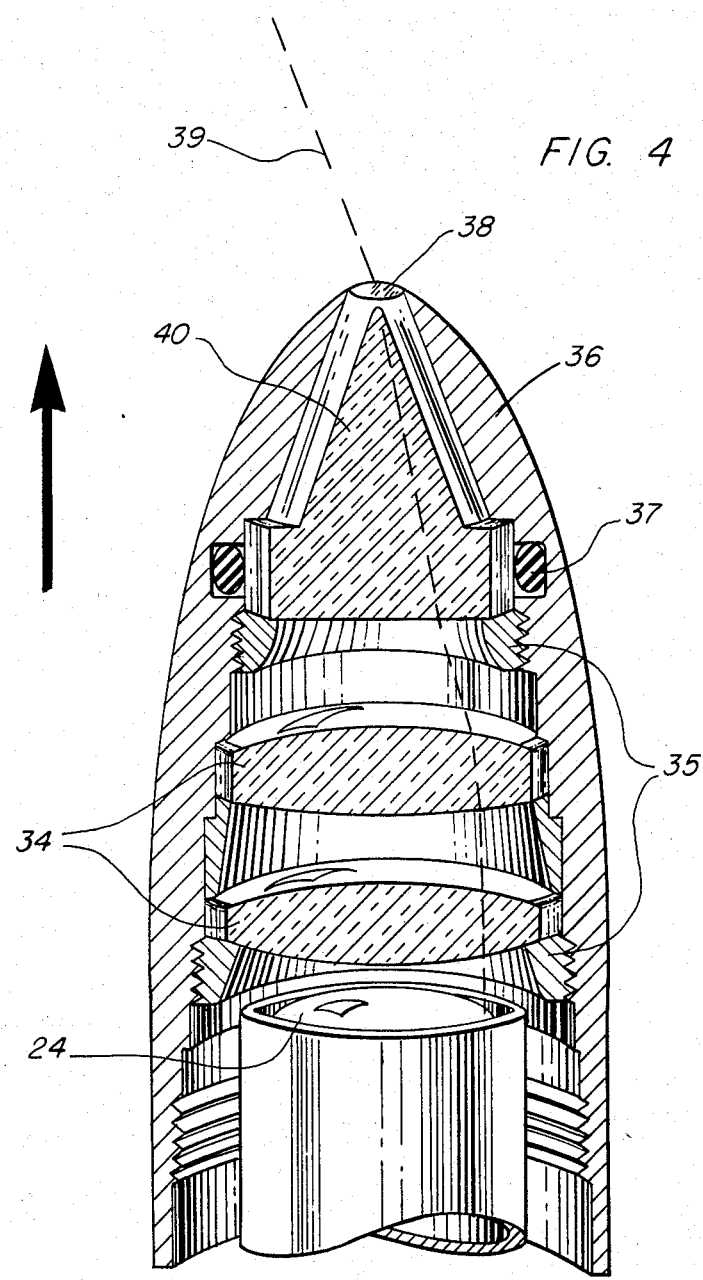
FIG. 4 is a partial cross-sectional view of the downstream end of an embodiment of the invention showing a typical cavitation prevention means constructed with a frusto-conical lens arrangement.

FIG. 4 illustrates the arrangement of a frusto-conical window 40 with complementary optical elements 34 retained by threaded collars 35 within a cavitation prevention cover 36. The frusto-conical window may be sealed within the plastic or stainless-steel cover by a flexible O-ring 37 and is arranged such that minimal area of its smallest diameter 38 interfaces the liquid stream, such that the cavitation prevention means substantially assumes a parabolic shape. (In the figure, the downstream direction is indicated by the bold arrow adjacent the drawing.)

A substantially wide field of view is provided as complementary optical elements refract incoming light ray 39 such as to be compatible with the camera lens 24. A detailed description of the refractive process, as well as alternate lens arrangements suitable to be complementary to the frustoconical window are described in U.S. Pat. No. 3,321,265, (issued May 23, 1967 to Clave et al).

Figure 5:
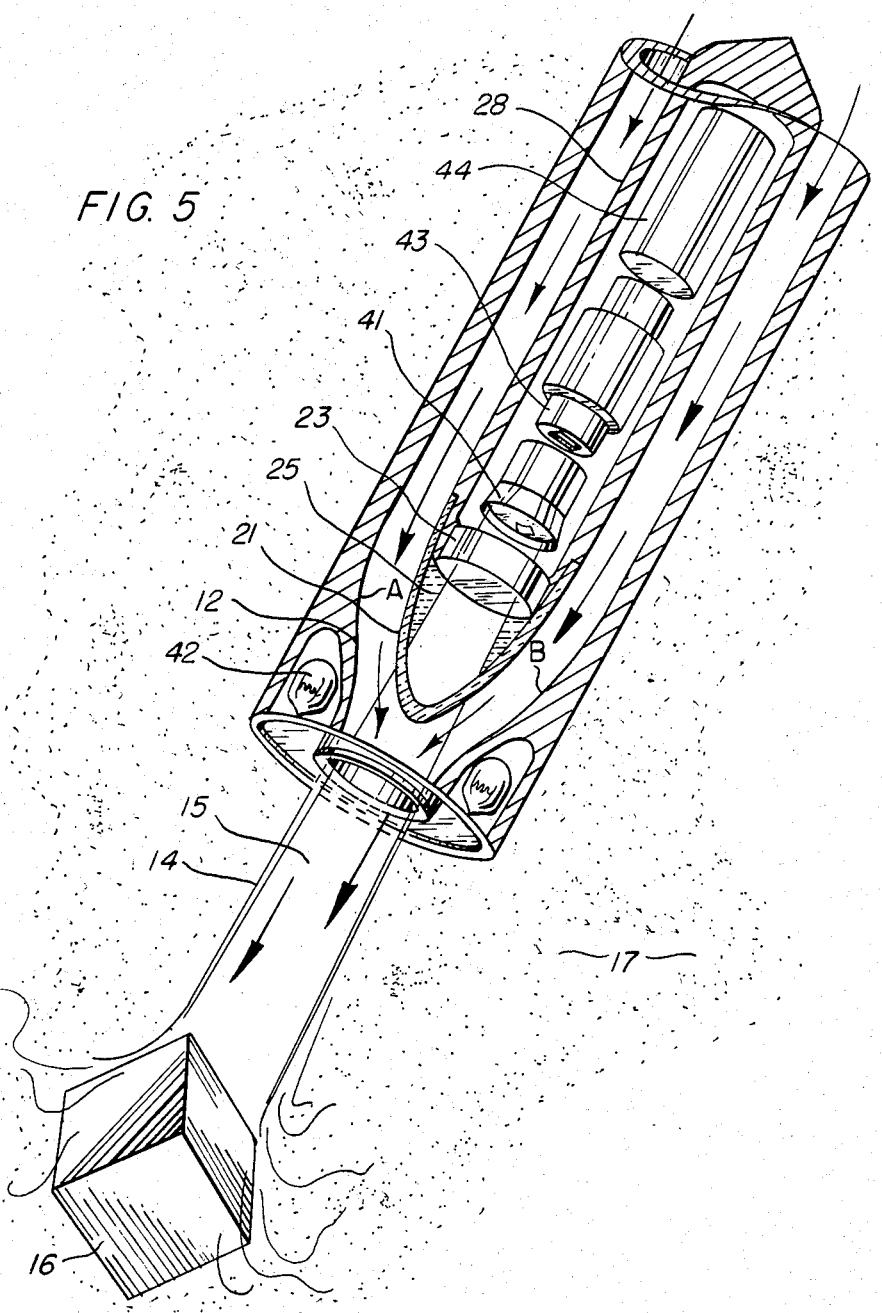
FIG. 5 is a diagrammatic perspective view illustrating in more detail the downstream portion of an apparatus suitable for observing and digging in mud.

FIG. 5 shows diagrammatically another embodiment of the invention suitable for use in water. Clear water is pumped via a delivery hose (not shown) and enters a first conduit or outer housing 12 and flows around the outside of camera housing 28 in the direction of the arrows as shown. The clear water stream thus provides a path of clear water to the object 16 in the line of sight 15 of the lens assembly 41. Illumination means shown here as circular light 42 is provided and light from the object 16 passes through the clear parabolic cover 21 and the space 25 filled with a compensating liquid such as a liquid of similar refractive index to that of water, through the compensating flat lens 23 to lens assembly 41. Vidicon (or Newvicon) 43 and camera circuitry 44 then process the image received for transmission to a remote observation point (not shown). By use of the clear parabolic cover 21 cavitation is reduced. Segments A and B of the inner wall of outer housing 12 are necked down so as to more closely follow the contours of the parabolic cover so that the cross-sectional area of the water stream flowing past the cover is maintained substantially uniform in order to assist in preventing cavitation.

Figure 6:
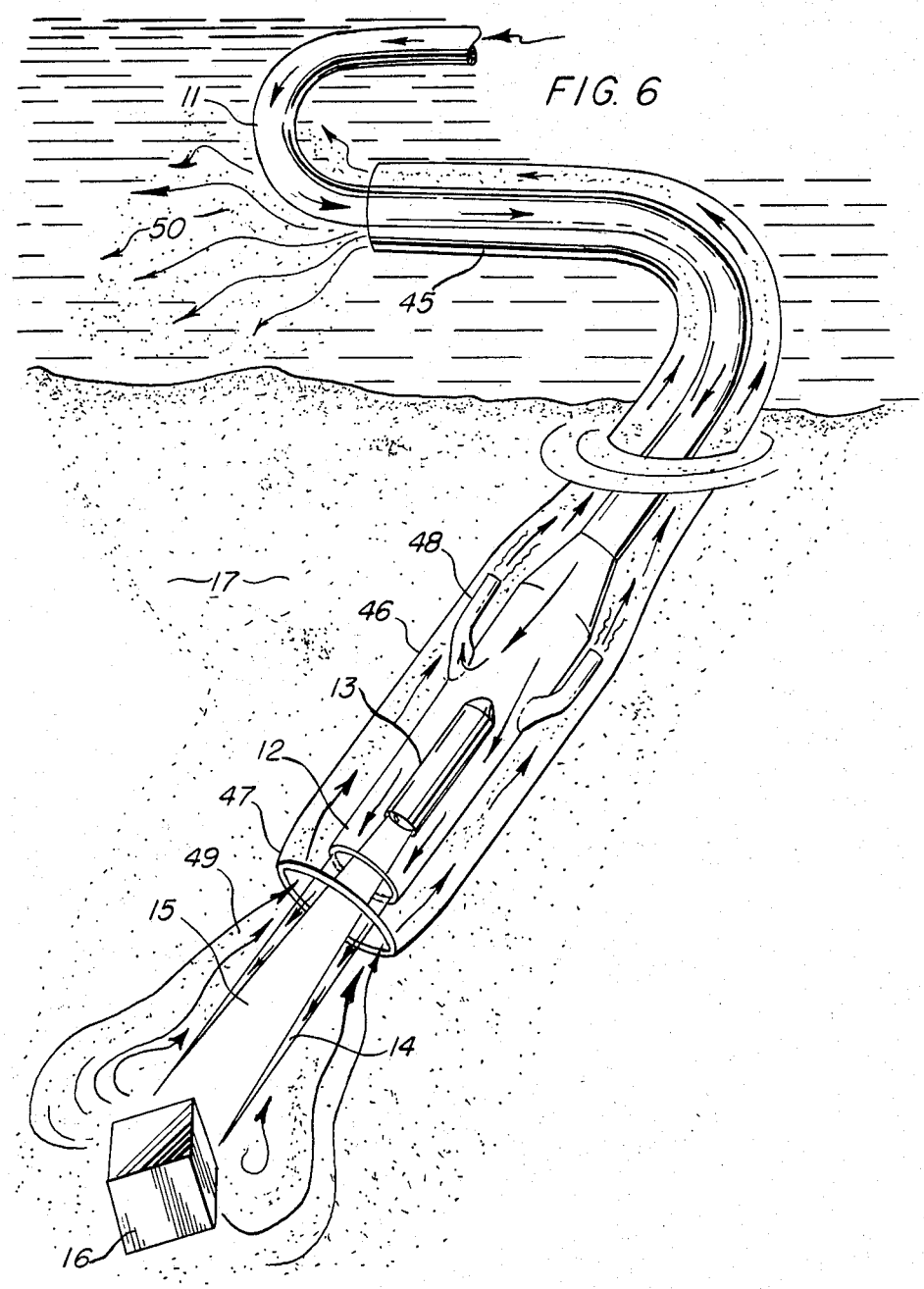
FIG. 6 is a diagrammatic representation illustrating generally the operation of an embodiment suitable for digging, observing, and debris removal.

FIG. 6 shows diagrammatically an embodiment suitable for use in mud or silt (indicated generally by numeral 17), excavation or searching under water. Clear water is pumped via a delivery hose 11 past the radiation receiving means or camera 13 to provide a path of clear liquid in the line of sight 15 to the object 16. In this arrangement a dredge delivery hose 45 surrounds delivery hose 11, extends to a second conduit or syphon dredge head 46 and terminates in a streamlined tip 47 adjacent the clear water exit. General streamlining of the exterior of the apparatus is to reduce the risk of becoming lodged in mud and for ease of movement. Delivery hose 11 extends to a first conduit or nozzle 12 which is adapted to direct a portion of the water stream flowing therethrough into reverse water-jet nozzles 48. Thus this redirected portion flows in a reverse direction (compared to the water stream in the first conduit) so that debris or other particulate matter, e.g. mud, disturbed by the clear water column 14 directed at the object 16, is drawn into the second conduit (as is shown generally by arrows 49). It is then carried away from camera 13 via dredge delivery hose 45 and either expelled into the water environment away from the excavation area as shown generally by arrows 50 or carried to a processing station (not shown) where it may be processed.

The apparatus shown in FIG. 6 may be tethered conveniently from a surface craft (not shown) by an umbilical hose or modified to become an attachment arm for a deep sea submersible, such as a Pisces submersible, or diving bell. A high pressure high volume pump may be used to supply water to the unit. When on a surface craft, water may be supplied through a reel which also raises and lowers the apparatus. At greater depths, a pump may be mounted on the apparatus or tethered at mid depth to reduce friction losses in the hose length. While on a submersible or when the pump is an integral part of the apparatus, a tail suction line should be bouyed away from the excavation area to ensure that clear water is being pumped for the camera.

Figure 7:
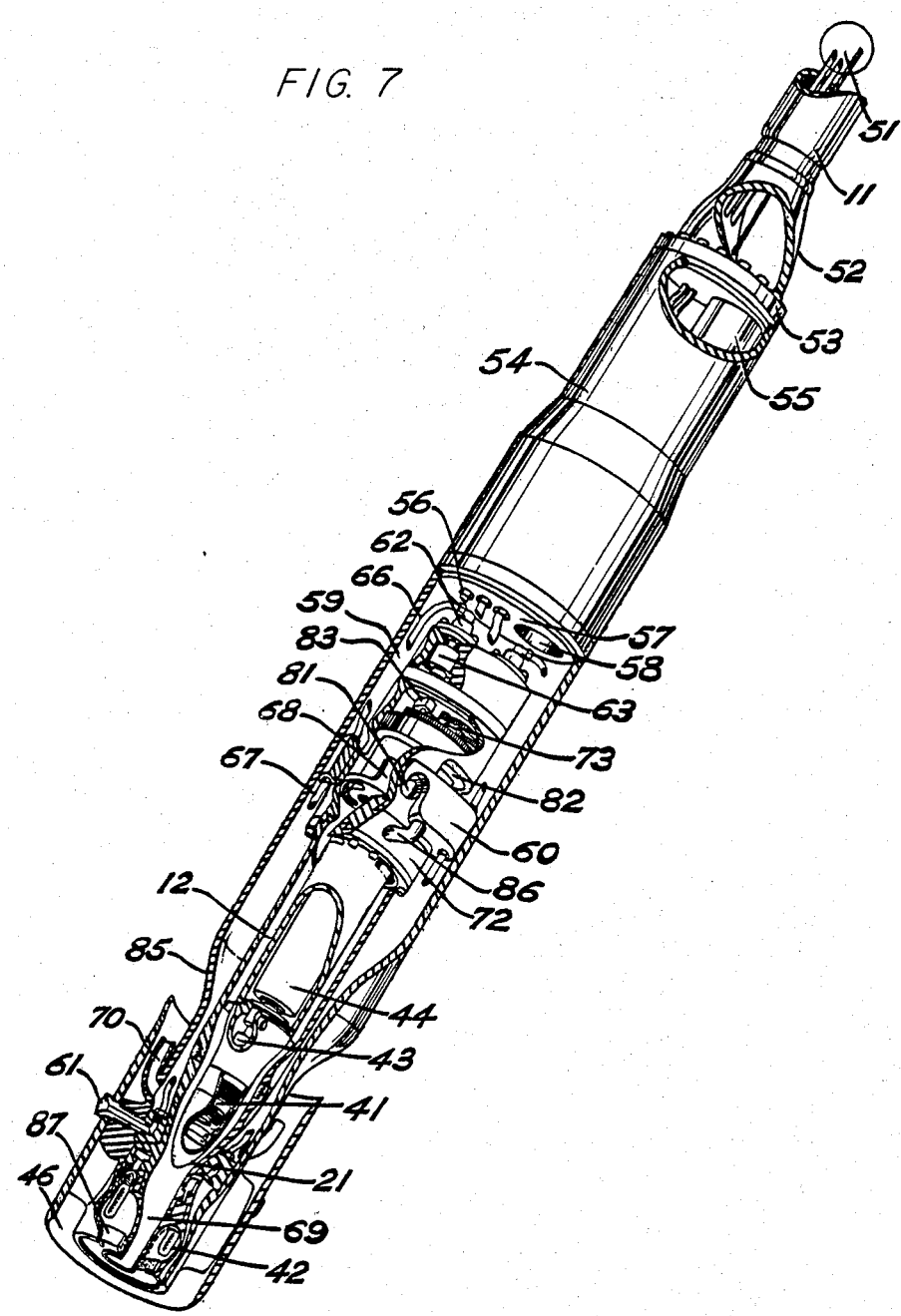
FIG. 7 is a detailed partially cutaway perspective view of the downstream portion of an embodiment of the invention.

A further embodiment, shown in FIG. 7, is suitable for mud or silt excavation or searching underwater and is also suitable for operation as a surface pumped, surface tethered unit. In FIG. 7 the delivery hose or umbilical hose 11 delivers water from the surface to the unit. Wiring (indicated generally by numeral 51) is fed through the same hose 11 as well as a braided support cable, and enters the unit at its coupling 52. The wiring is sealed into coupling 52 and fed through a bulk head 53 into an electronics control compartment 54. The water flow by-passes compartment 54 and passes down a pipe 55.

The following components (not shown) may be housed in electronics control compartment 54: the power supply for the camera; an RF (Radio Frequency)-from-Video converter (that enables the photographed signal to be transported more readily); an RF amplifier; power supply reductions as required by some of the functions; and commercially available microprocessor receiver modules for each function of the device. The latter facilitating only one aerial wire for all functions between the microprocessor transmitter and the receivers.

Wiring 56 for each function is fed from the electronics compartment 54 through a second bulk head 57 to the respective components. The pumped water arrives at the bottom of pipe 55 to exit at outlet 58 where it enters chamber 59, trapped between second bulk head 57 and a third bulk head 60.

Figure 8:
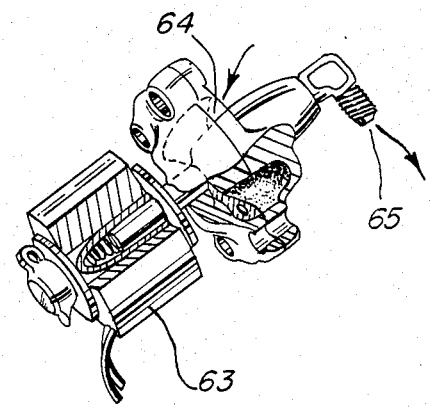
FIGS. 8 and 9 are enlarged exploded views of the diaphragm valve and the rotary control valve respectively, shown in FIG. 7.

Four steering jets 61 which may be operated to manoeuvre the device horizontally are controlled by four valves 62. One of these valves 62 is shown in FIG. 8 in enlarged form (such valves are available commerically and may be substituted for some other type of valve by persons skilled in the art). It may have a solenoid 63 which controls, a diaphragm valve, with machined modification to inlets 64. Inlets 64 are illustrated open to chamber 59 (FIG. 7) and pump input pressure. Water is transported from the outlets 65. In FIG. 7 piping 66, 67 carries this water through bulk head 60 to the respective thrust jet 61. The four jets 61 may be operated by a joy-stick control on the surface.

Figure 9:
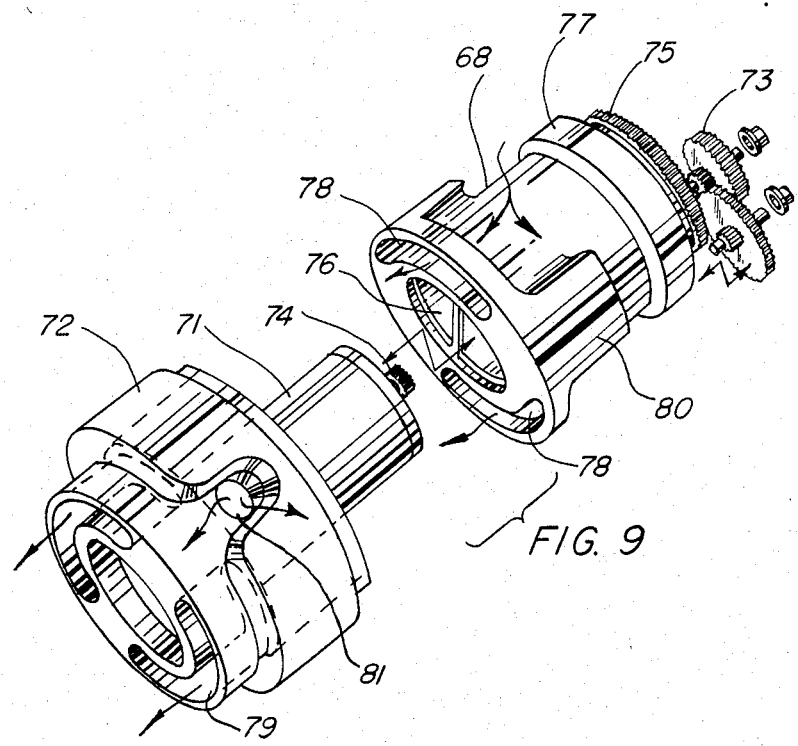

A rotary control valve 68 controls water flow to a main cutting nozzle 69 which is the downstream end of first conduit 12 and to two scavenging nozzles 70, via chamber 59. FIG. 9 is an enlarged illustration of valve 68. In FIG. 9, a drive motor 71 that rotates valve 68 is contained in motor housing 72 and through the centre of valve 68, where it runs a set of reduction gears 73, between a pinion 74 on the motor 71 and the ring gear 75 on valve 68. Valve 68 may run on internal water lubricated teflon bearings 76. The drive gears are sealed from the water by seals running internally and externally about running surfaces 77 and 71. By rotating valve 68, slots 78 on the valve, may align with slots 79 in the housing 72 for maximum flow to the cutting nozzle 69 (FIG. 7).

Also, by rotating the valve lugs 80 on valve 68, communication between the main water stream and the scavenge nozzles 70 (FIG. 7) may be controlled via two ports 81. Referring to FIG. 7, pumped water enters the rotary valve 68 by two ports 82 which are always open. Valve 68 causes flow to the scavenge nozzles 70 to be controlled at a rate inversely proportional to the flow rate of the cutting nozzle 69 and vice-versa, so that the flow may be balanced at any desired ratio between them allowing some forward and reverse control (up-down control may be achieved independently by means of the reel as mentioned above), and also allowing some hovering ability in a silt or mud environment. The rotary valve also controls the water flow past the camera. Another feature of the rotary control valve is that it has two micro switches 83 that allow the rotary valve 68 to advance to full opening of main cutting nozzle 69 or full scavenge nozzles 70.

Figure 10:
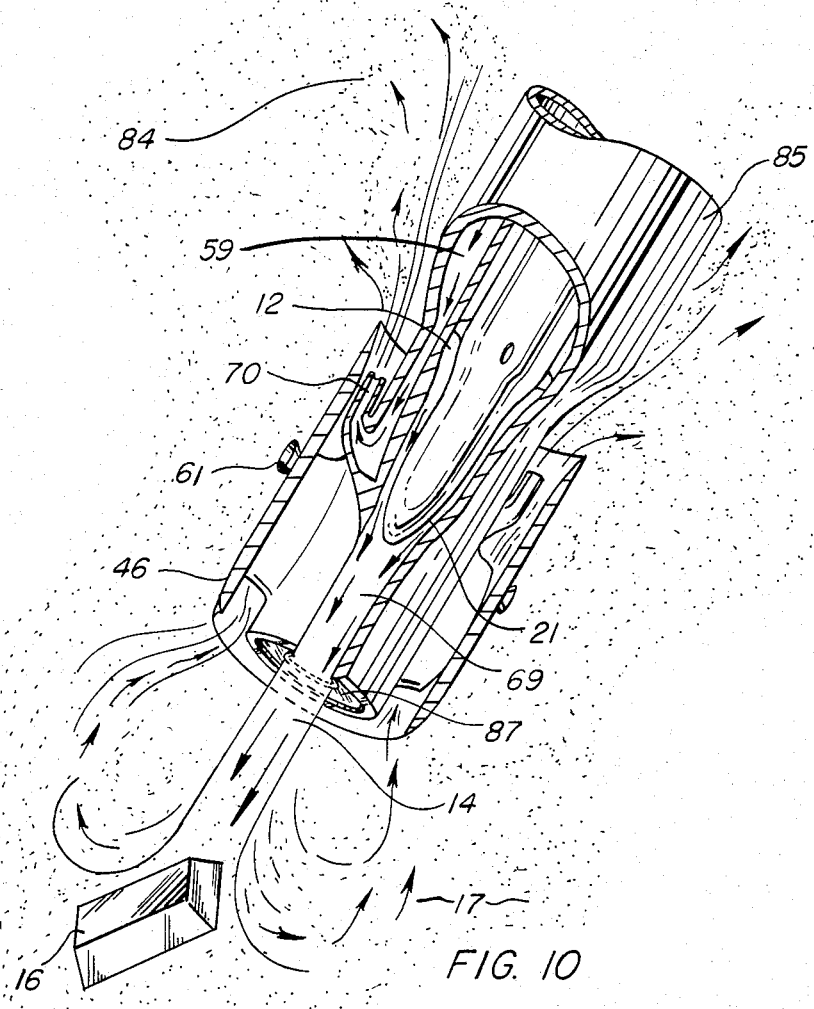
FIG. 10 is a more detailed partially cutaway perspective view of the downstream end of the embodiment shown in FIG. 7.

In FIG. 10, in a dredging and digging operation, a water jet from the cutting nozzle 69 excavates mud (indicated generally by numeral 17). The mud then enters the cowling or second conduit 46 by suction, caused by scavenging nozzles 70 and is then expelled from the other end of cowling 46 and outwards (indicated generallyby numeral 84), past the body 85 of the device.

If it is desired to save and process this scavenged mud, an attachment which fits between the cowling 46 and the main body 85, directs the mud through a hose and to the desired processing area, such as a sluice-box. A further attachment, namely a mobile claw may also be incorporated to grip or manipulate objects as they are observed. It also enable quicker surveying or salvage in a muddy area.

An important feature of the embodiment of FIG. 7 is that it allows an operator in a control station remote from the excavation area to witness the excavation. Surface controls at such a remote control station may include: a video monitor; up-down reel controls; a joystick control for horizontal manoeuvring; a joy-stick control for the cutting and scavenging nozzles valve adjustment; a full scavenge or full cut switch; claw or manipulator controls; light switches and dimmers; camera focus; claw open and close; and possibly other controls for the operator to control and manoeuvre the surface craft as well, such as swivel stern and bow jets or props.

The remote observation is accomplished by seeing through the clear stream 14 (see FIG. 10) caused by the cutting jet 69. The water in the cutting jet 69, arrives clear, since it is pumped from a source of clear water away from the excavation, such as adjacent the surface. A video camera is mounted in the centre of the first conduit 12. Camera wiring 86 is fed from housing 72 through bulk head 60 to the wiring junctions of bulk head 57.

Most solid-state cameras may be used, by arranging components in a tube so that the lens assembly 41, Vidicon (or Newvicon) 43, and camera circuitry 44, are all in line. By making the camera long and narrow, the volume of water required to form a column or cutting jet 14 (see FIG. 10) may be reduced. The width of field or area the camera can see, depends on the diameter of the water column (cutting jet), thus the volume of water supplied to the nozzle 69. The distance the camera can see depends on volume and pressure as well. The camera may also be lifted off the bottom and manoeuvred by its steering jets to survey another field of view. An auxiliary wide-angle lensed regular video camera mounted on the side of the hull may also serve this purpose.

Dimmers on the lights may permit the lights to be adjusted to different operating conditions. The light bulbs 42 may be arranged in a circular fashion at the tip of the cutting nozzle, with a circular lens 87 inserted around the cutting nozzle 69.

As cavitation prevention means, a clear glass or acrylic cover 21, parabolically shaped, hollow, and of uniform wall thickness (or slightly thickening towards the downstream end) is placed over lens assembly 41 of the camera to reduce cavitation at the tip of the camera.

The apparatus of the invention may also be used on land where objects to be excavated are buried in earth or other matter conveniently removable by a liquid stream.

What I claim as my invention is:

1. An apparatus comprising radiation receiving means for observing an object when the radiation receiving means is in a clear liquid stream flowing towards the object, the radiation receiving means comprising an observation window and cavitation prevention means disposed adjacent the observation window downstream thereof, the cavitation prevention means substantially assuming the shape of a zone of cavitational probability of a downstream end of the radiation receiving means when in a liquid stream of a selected velocity at which cavitation is possible, said cavitation prevention means thereby preventing cavitation when the liquid stream passes said downstream end of the radiation receiving means at or below the selected velocity.

2. An apparatus according to claim 1 wherein the liquid is water and the radiation is visible light.

3. An apparatus comprising visible light radiation receiving means for observing an object when the radiation receiving means is in a clear water stream flowing towards the object, the radiation receiving means comprising an observation window and cavitation prevention means disposed adjacent the observation window downstream thereof, the cavitation prevention means substantially assuming the shape of a zone of cavitational probability of a downstream end of the radiation receiving means when in a water stream of a selected velocity at which cavitation is possible, said cavitation prevention means thereby preventing cavitation when the water stream passes said downstream end of the radiation receiving means at or below the selected velocity, wherein the apparatus further comprises a first conduit to guide the water stream towards the object and the radiation receiving means is located within said first conduit.

4. An apparatus according to claim 3 capable of generating a liquid stream of sufficient velocity to uncover an object buried in loose particulate matter.

5. An apparatus according to claim 3 wherein the radiation receiving means comprises a video camera for continuous viewing.

6. An apparatus according to claim 3 wherein ilumination means is arranged around the observation window to illuminate the object.

7. An apparatus according to claim 3 further comprising a valve capable of remote operation so that by manipulating a part of the water stream the location of the downstream end of the first conduit may be controlled.

8. An apparatus according to claim 3 further comprising manipulating means capable of remote operation for manipulating the object under observation.

9. An apparatus according to claim 3 wherein the cavitation prevention means encloses a compensating liquid whose refractive index is substantially the same as that of the water stream to prevent refractive distortion of the radiation reaching the radiation receiving means.

10. An apparatus according to claim 3 wherein the cavitation prevention means encloses a compensating liquid whose refractive index is substantially different from that of the water stream for a magnification, diminishing or wise-angle effect.

11. An apparatus according to claim 3 wherein the cavitation prevention means extends to a point, to enhance prevention of cavitation in a water stream of high velocity.

12. An apparatus according to claim 3 wherein a frusto-conical window with complementary optical elements is located in the cavitation prevention means at the downstream end thereof to allow an increased angle of view with minimal window area interfacing the water stream.

13. An apparatus according to claim 3 wherein the radiation receiving means is located within the first conduit such that the cavitation prevention means is adjacent the downstream end of the first conduit and the first conduit is shaped to follow the shape of the cavitation prevention means such that the water flowing past the cavitation prevention means has a cross-sectional area which is substantially uniform.

14. An apparatus according to claim 13 wherein a frusto-conical window with complementary optical elements is located in the cavitation prevention means at the downstream end thereof to allow an increased angle of view with minimal window area interfacing the water stream.

15. An apparatus according to claim 13 wherein the radiation receiving means comprises a video camera for continuous viewing.

16. An apparatus according to claim 13 wherein illumination means is arranged around the observation window to illuminate the object.

17. An apparatus according to claim 13 further comprising a valve capable of remote operation so that by manipulating a part of the water stream the location of the downstream end of the first conduit may be controlled.

18. An apparatus according to claim 13 further comprising gripping means capable of remote operation for gripping the object under observation.

19. An apparatus according to claim 13 wherein the cavitation prevention means encloses a compensating liquid whose refractive index is substantially the same as that of the water stream to prevent refractive distortion of the radiation reaching the radiation receiving means.

20. An apparatus according to claim 13 wherein the cavitation prevention means encloses a compensating liquid whose refractive index is substantially different from that of the water stream for a magnification, diminishing or wide-angle effect.

21. An apparatus according to claim 13 wherein the cavitation prevention means extends to a point, to enhance prevention of cavitation in a water stream of high velocity.

22. An apparatus according to claim 13 wherein a frusto-conical objective lens is located in the cavitation prevention means at the downstream end thereof to increase the angle of view.

23. An apparatus according to claim 13 wherein the downstream end of the first conduit is convergent to increase the back-pressure within the apparatus and discharge velocity of the water stream.

24. An apparatus according to claim 13 wherein the downstream end of the first conduit is divergent to reduce back-pressure within the apparatus and velocity of the discharged water stream.

25. An apparatus according to claim 13 wherein the first conduit is disposed within a second conduit, the second conduit being adapted to transport debris or particulate matter away from the radiation receiving means.

26. An apparatus according to claim 25 wherein the first conduit is adapted so that a portion of the liquid stream passing through the first conduit is caused to flow in a reverse direction in the second conduit.

27. An apparatus according to claim 25 further comprising processing means for processing debris or particulate matter transported by the second conduit.

28. An apparatus according to claim 25 where the display means may be disposed adjacent to or remote from the radiation receiving means.

* * * * *